United States Patent

Horowitz et al.

[11] 4,337,057
[45] Jun. 29, 1982

[54] TRANSMISSION CHAIN

[75] Inventors: Alexandre Horowitz; Martinus H. Cuypers, both of Eindhoven, Netherlands

[73] Assignee: Varitrac AG, Switzerland

[21] Appl. No.: 193,174

[22] Filed: Oct. 1, 1980

Related U.S. Application Data

[63] Continuation of Ser. No. 183,568, Sep. 2, 1980, abandoned.

[30] Foreign Application Priority Data

Sep. 6, 1979 [NL] Netherlands ............... 7906681

[51] Int. Cl.[3] .................. F16G 15/14; F16G 5/18
[52] U.S. Cl. .................... 474/242; 474/214; 474/215
[58] Field of Search ........... 474/214, 215, 216, 217, 474/201, 242-245

[56] References Cited

U.S. PATENT DOCUMENTS

| | | | |
|---|---|---|---|
| 1,564,798 | 12/1925 | Sturtevant | 474/214 X |
| 1,678,315 | 7/1928 | Belcher | 474/215 |
| 1,691,871 | 11/1928 | Reeves | 474/245 |
| 2,550,431 | 4/1951 | Shaw | 474/252 X |
| 3,685,362 | 8/1972 | Usov et al. | 474/230 |
| 4,130,026 | 12/1978 | Jeffrey | 474/215 |

FOREIGN PATENT DOCUMENTS 1146316  3/1963  Fed. Rep. of Germany .
293937   7/1928  United Kingdom .

Primary Examiner—Lawrence J. Staab
Assistant Examiner—Conrad Berman
Attorney, Agent, or Firm—Ostrolenk, Faber, Gerb & Soffen

[57] ABSTRACT

The disclosure concerns a transmission chain. The chain may be used in a transmission with conical disks (not shown). The chain comprises a number of links intercoupled by hinge pins extending through openings in the links. The interacting surfaces of each link are, on the one hand, one of the sides of each of the openings of the links coupled by a hinge pin and, on the other hand, one of the opposite curved side surfaces of a single hinge pin.

24 Claims, 16 Drawing Figures

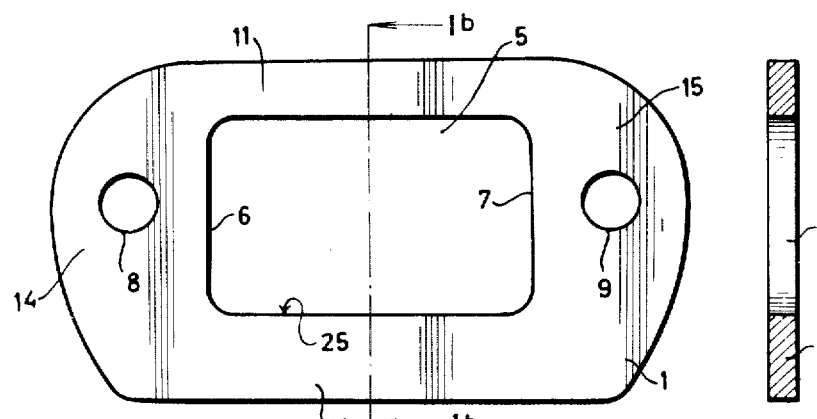
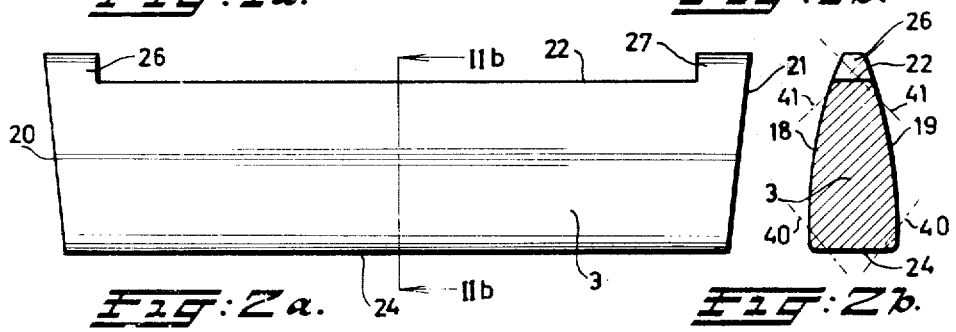
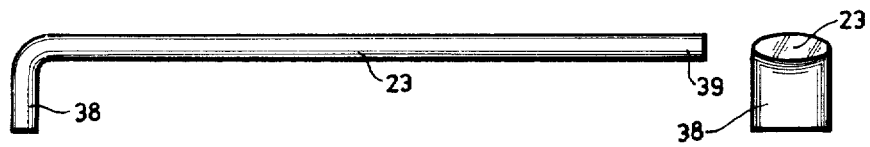
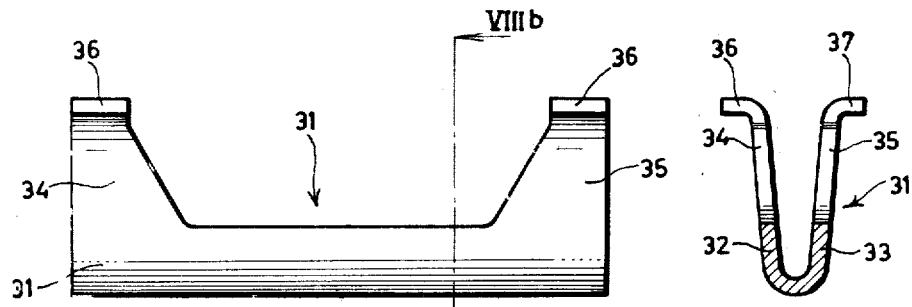

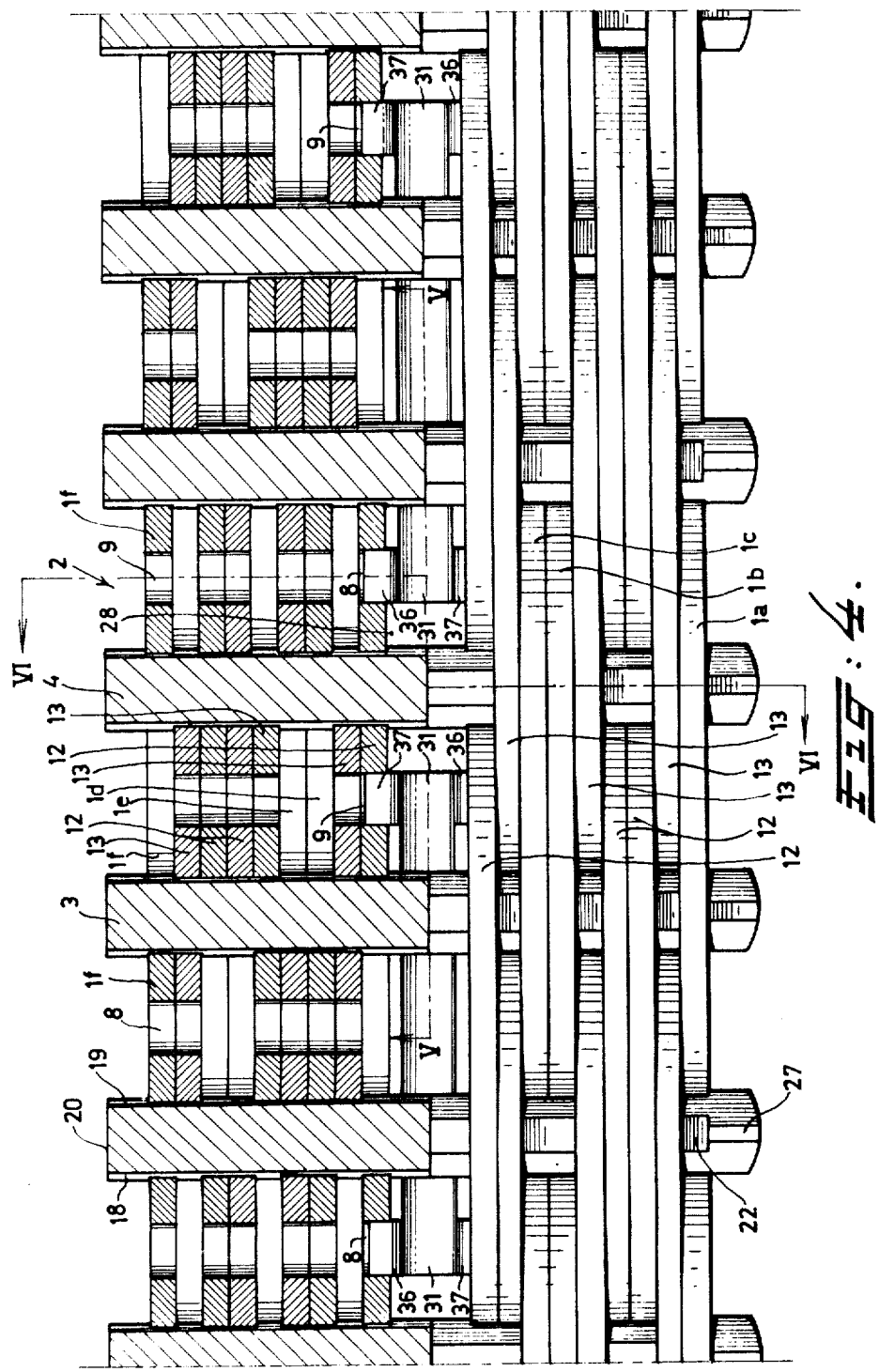

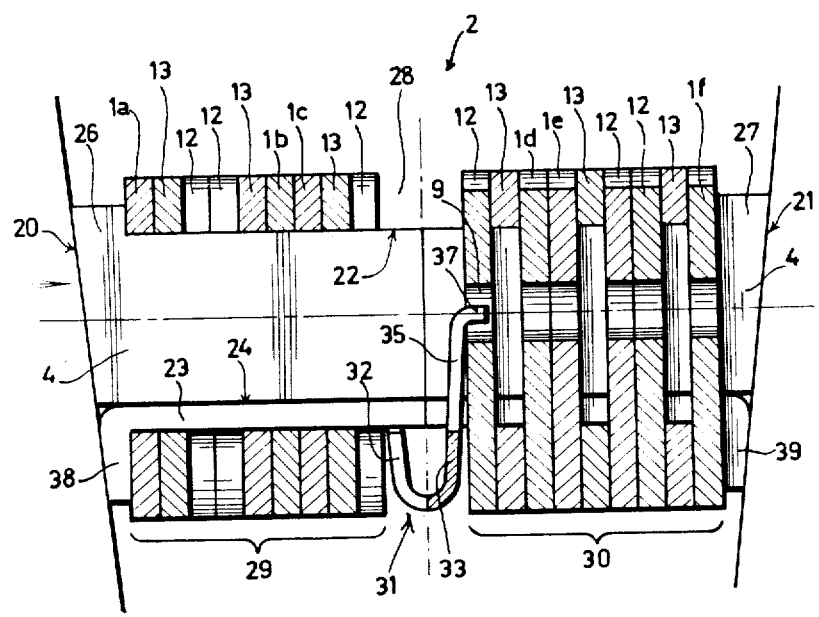
FIG: 6.
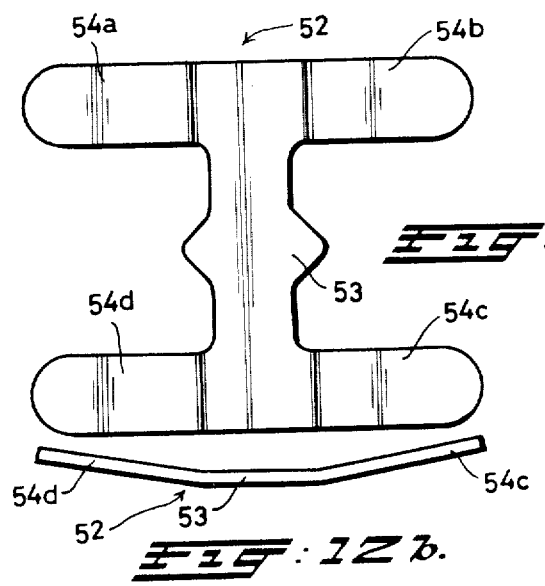
FIG: 12a.
FIG: 12b.

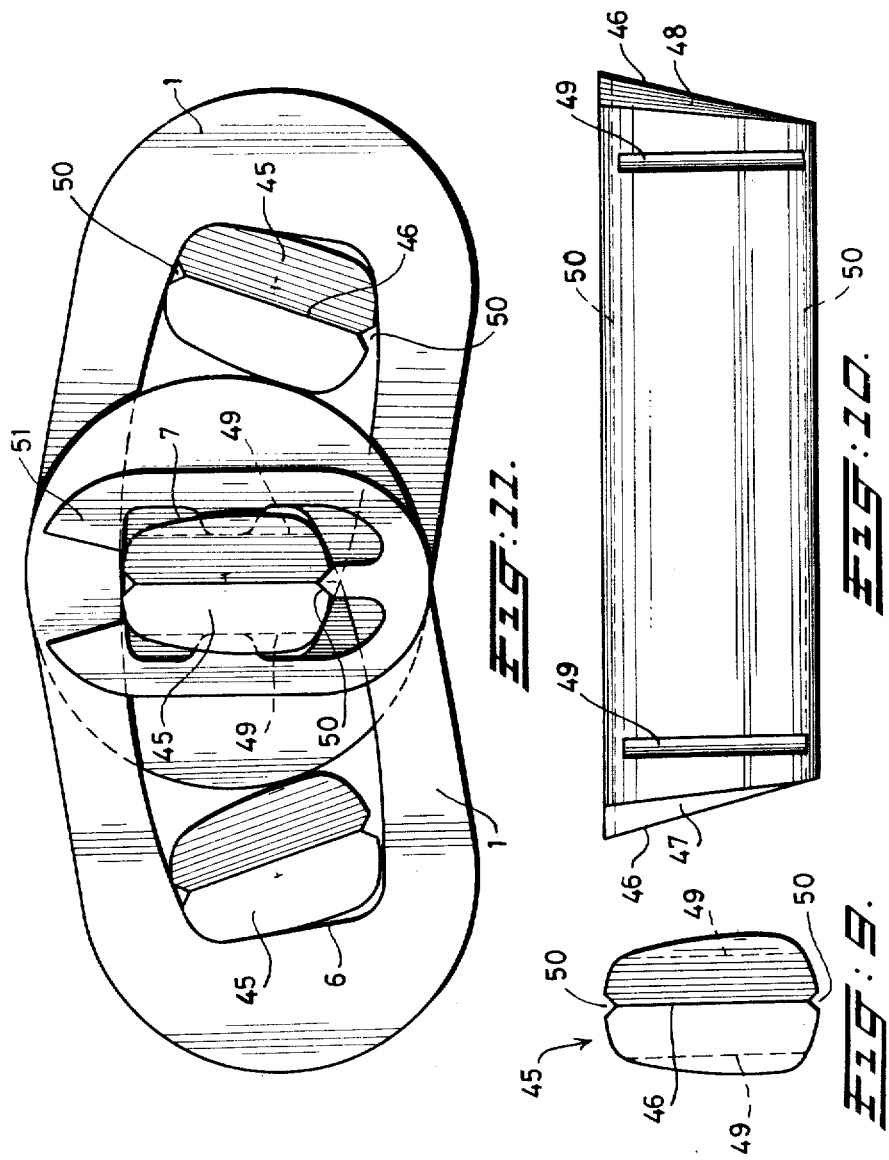

TRANSMISSION CHAIN

CROSS-REFERENCE TO RELATED APPLICATION

This is a continuation of application Ser. No. 183,568, filed Sept. 2, 1980 now abandoned.

FIELD OF THE INVENTION

The present invention relates to a transmission chain. The chain may be used in association with a transmission with conical discs, particularly of the type with continuously varying transmission ratio. The chain comprises a number of links that are intercoupled by hinge pins that pass through openings in the links. The hinge pins have end surfaces which frictionally engage the cone surfaces of the discs of the transmission. The hinge movement occurs by interaction between the curved pin surfaces and the edges of the openings in the links.

DESCRIPTION OF THE PRIOR ART

In one known transmission chain of the foregoing type, each hinge pin consists of two halves. Each half includes a cylindrically curved surface which rolls over that surface of the other half. The longitudinal ends of these pin halves bear against the conical disc surface of the transmission so that, during the movement of the chain through the curve in its pathway, formed at the disc, the position of the two pin halves with respect to each other changes. This occurs together with a change of the angular orientation of the pin halves with respect to the conical disc surface. As a result, the maximum force which can be transmitted is limited because the contact between the pins and the discs must be a point contact with very reduced surface. There is consequent rapid wear and the generation of noise.

SUMMARY OF THE INVENTION

The object of the invention is to improve a transmission chain of the above kind and to make it suitable for the transmission of large forces. Further, the invention seeks to provide a chain with a simple, inexpensive structure, which is easy to assemble.

According to the invention, the interacting surfaces of each link of the chain are, on the one hand, one of the lateral sides of each of the openings of the links coupled by a hinge pin and, on the other hand, one of the opposite curved side surfaces of a single hinge pin inserted through those openings. Thus, the position of the pin with respect to the discs does not change when once they are gripped between them. As a result, pins with a long, narrow contact edge can be used and the chain can transmit considerably greater power. The complete chain is made up from simple parts, is easy to manufacture and is, thus, relatively inexpensive.

In the chain of the invention, each hinge pin is cylindrically curved on its two opposite lateral sides, symmetrically with respect to a longitudinal, vertical center surface through the pin. The curvatures are asymmetric with respect to a horizontal plane perpendicular to that vertical center surface.

To ease assembly of the chain, in one embodiment, each hinge pin has dimensions which allow it to be inserted freely into the opening of a link element. The opposite longitudinal ends of the hinge pin constitute the friction surfaces for engaging the conical discs. Near these ends the pin is provided with slots around its circumference to accommodate respective locking circlips.

However, in another embodiment, it is also possible to use a hinge pin with a surface which is re-entrant with respect to the pin end that faces toward the outer chain side. The height of the aperture of the link elements in which the pins are placed permits the sideways insertion of the pins. On the inner chain side, a locking strip or key is inserted between the lower side of a pin and the adjacent aperture edge of the link elements. The key has a thickness sufficient to lock the link elements between the projecting end sections of the hinge pin.

A strong chain structure is obtained when link element end portions, which are located between two consecutive hinge pins, overlap each other and when each link element end portion occupies the distance between the opposed side surfaces of two consecutive hinge pins.

Preferably, each link element has a four-sided aperture through it in which two hinge pins are located. Each pin lateral side rests against one of the upstanding sides of the aperture. One of these lateral sides leads in the motion of the chain and the other lateral side trails. The link element leg located on the inside of the endless chain, between the link ends, has a greater height, i.e. a taller cross-section, than the height of the opposite outside leg.

A complete chain is able to transmit great power when the link elements from which the link is assembled are distributed symmetrically at both sides with respect to a longitudinal center surface of the chain. This leaves open intervening spaces in which the link elements of two links, which rest flush against the associated link on either side, are similarly distributed symmetrically with respect to the said center surface. As a result, the link arrangement every three pitches between the hinge pins is repeated.

The chain structure is improved when the rows of link elements on the hinge pins are separated into separate groups by a free, longitudinal slot. With the aid of pressure means placed in the slot, the link elements are pressed outward, along the lengthwise direction of the pins, against each other and against locking means for the link group.

The pressure means may be a spring plate that is bent approximately stirrup-shaped or U-shaped, with legs which are provided with outward-facing projections near the ends of the legs. The projections can engage longitudinally without any play in apertures in the link elements. Alternatively, the pressure means may comprise an essentially H-shaped spring member having legs, and when the pressure means is unloaded, the ends of the legs lie outside a plane through the middle part of the pressure means. This pressure means is oriented so that its bent shape biases the link elements apart. The above-mentioned measures considerably reduce friction losses, provide good support of the hinge pins in the links, provide good lateral positioning of the group of link elements from which the links are formed, protect against skew pulling of the hinge pins, favorably distribute the link elements of consecutive links interacting with a hinge pin so as to restrict bending movements in the pins, and assure minimum weight for the complete chain.

Other objects and features of the invention will be apparent from the following description and accompanying drawings.

BRIEF DESCRIPTION OF THE DRAWINGS

FIG. 1a is a side view of one of the link elements for use in a complete chain;

FIG. 1b is a cross section of the link element along the line 1b—1b in FIG. 1a;

FIG. 2a is a side view of a hinge pin;

FIG. 2b is a section of the hinge pin along the line IIb—IIb of FIG. 2a;

FIG. 4 shows a straight chain part, wherein the lower part of FIG. 4 is a top view of a straight chain part, while the top part of FIG. 4 shows a longitudinal section of the chain part along the line IV—IV in FIG. 5;

FIG. 6 shows a cross section along the line VI—VI in FIG. 4, the cross section in the left-hand part of FIG. 6 going through a hinge pin with only the link components shown in cross section, while the cross section in the right-hand part of FIG. 6 goes through a plane between two hinge pins;

FIG. 7a shows a side view and FIG. 7b an end view of a locking key for locking a hinge pin into position in link elements;

FIG. 8a illustrates a pressure means and locking clamp for the link elements, in side view, and FIG. 8b provides a section along the line VIIIb in FIG. 8a;

FIG. 9 is an end view of another embodiment of a hinge pin;

FIG. 10 is a side view of this hinge pin;

FIG. 11 shows a combination of these hinge pins with the link elements;

FIG. 12a is a plan view of another pressure means spring element for use in an assembled chain; and FIG. 12b is a side view of this spring element.

DESCRIPTION OF THE PREFERRED EMBODIMENTS

Figure 5:
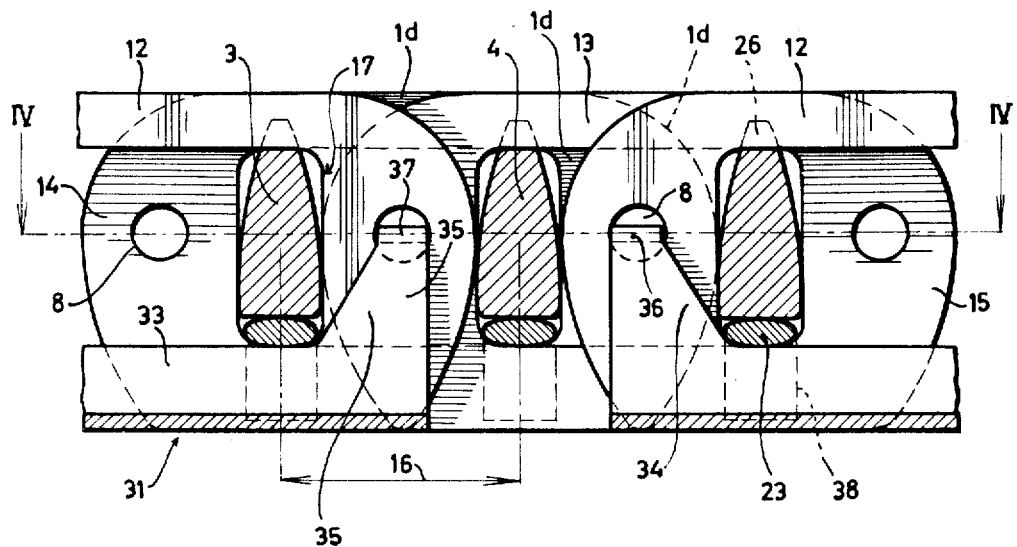
FIG. 5 shows a longitudinal section of a chain part along the line V—V in FIG. 4.

FIGS. 1a and 1b show a link element 1 of a chain according to the invention. The below described link elements 12 and 13 are identical. The different reference numerals 1, 12, 13 are assigned due to the different relative positions of these link elements, as shown in FIG. 4. Although the link element 1 (as can be seen for example in FIG. 3) accommodates two below described hinge pins 3 and 4, the link element has an extremely simple shape and is quite low in weight. The entire center portion of the link element 1 is absent, defining a single aperture 5 in the link element. The straight vertical side edges 6 and 7 of the aperture 5 each form one of the contact surfaces of the hinge connection between the link element and one of the hinge pins 3 and 4. The left side edge 6 may be the leading edge of the opening in the motion of the chain and the right side edge 7 may be the trailing edge. The apertures 8 and 9 in the opposite end portions of the link element are provided in those link elements for receiving a pressure means locking clamp 31, described below, for interlocking a number of adjacent link elements which together form a link, as can be seen in FIGS. 4–6.

In the endless chain, the lower leg 10 of link element 1 beneath aperture 5, which is the leg that is directed to the inside of the moving endless chain, has a greater height than the upper, outside leg 11 above aperture 5, because the inside leg has to absorb the maximum forces. The link element 1 has its greatest length dimension of roughly 22.5 mm. All drawing Figures herein are drawn to the same scale, so that the Figures provide a good idea of the dimensions of the other chain parts.

The links of the chain can be manufactured simply from steel plate and can be hardened afterwards.

In FIGS. 4 and 6 the link elements 1 are numbered $1_a$–$1_f$. There are other link elements 12 and 13. These Figures also show that a complete link is built up from six link elements 1. However, it is also possible to use an even larger number of link elements 1, e.g. eight, combined with each other in a corresponding way.

The following description will discuss only those link elements 12 and 13 which engage, to the left and to the right of the link $1_a$–$1_f$, on those hinge pins 3 and 4 which traverse the link 1, because the structure is the same over the entire length of the chain.

FIGS. 3–6 show that the hinge pin 3 extends through the open center portion 5 of the link 1. The pin 3 is also surrounded by the end part of the link 12. Correspondingly, the pin 4 passes through the other side of the center portion 5 and it is surrounded by the end part of the link 13. These end parts are identified in FIG. 1a by 14. They are loaded in bending. But, they have such a height and width that they can take up the maximum tensile forces which may occur in operation. In the space between the hinge pins 3 and 4, the end parts of the link elements 12 and 13 overlap each other and the spacing between the hinge pins need not be much greater than the width of an end part. When the hinge pins are rather thin in width along the longitudinal direction of the chain (see the pin 3 shown in FIGS. 2a, 2b), the pitch spacing 16 between each two consecutive hinge pins can be kept very small, resulting in very even running of the chain.

Figure 3:
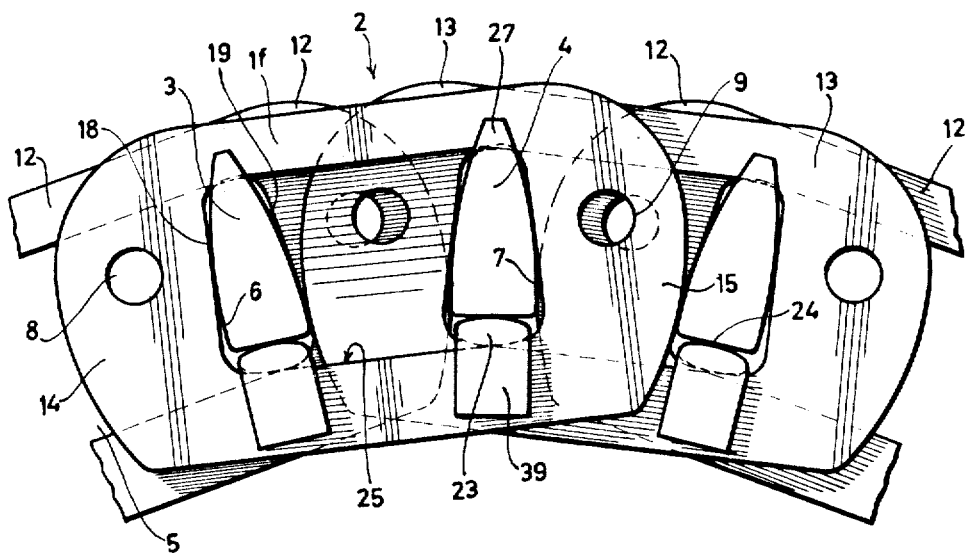
FIG. 3 is a side view of a curved chain section with links, comprised of link elements as shown in FIG. 1.

FIGS. 3 and 5 show that the pin 3 is enclosed between the side edge 6 of the aperture 5 of the link element 1 and the side edge 17 of the corresponding aperture in link element 12. The other pins are enclosed in a corresponding way between the lateral sides of the respective link element apertures. Each of these aperture sides, together with the pin sides which come into contact therewith, form the desired contact surfaces over which the pins 3 and 4 roll during movement of the chain.

The pin 3 can thus be given a very simple shape, and be easy and cheap to manufacture. Although it would be theoretically possible to make the pin 3 with flat sides and to curve the aperture edges 6 and 7 which are in contact with the pin sides, from a production viewpoint, it is simpler to make a pin with a cylindrically curved profile on its two lateral side surfaces 18 and 19, as shown in the section in FIG. 2a, and to make the link aperture with straight edges 6 and 7. As can be seen in FIGS. 2b and 5, the surfaces 18, 19 are asymmetrically curved with respect to the horizontal center line of the pin. This ensures that under the influence of the forces acting upon it, the hinge pin 3 is in contact, at the ends 20, 21 thereof, with the cone pulleys (not shown) of a gear transmission (not shown) in a radial position as much as possible. This is essential in order to obtain optimum frictional contact with minimum frictional losses.

Based upon the arrangement of link elements $1_a$–$1_f$ and of link elements 12 and 13 shown in FIGS. 4 and 6, the link elements $1_a$–$1_f$ from which the link is made up are symmetrically distributed with respect to a longitudinal center surface IV—IV of the chain. They leave free intervening spaces in which the link elements of two links 12, 13 which connect with the link 1 concerned, on either side, are similarly symmetrically distributed with respect to the center surface of the chain. This arrangement is repeated every three pitches 16 between the hinge pins.

With this arrangement, the bending moment in the hinge pins, which results from the tension in the links, is kept as small as possible. It is thereby possible to reduce the thickness of the hinge pins, which enables use of a small pitch 16 mentioned previously.

In FIGS. 2, 7 and 3–5, each hinge pin 3 has, facing the outward side of the endless chain, a surface 22, which is re-entrant with respect to the pin ends 20, 21. The height of the aperture 5 of the link elements in which the pins 3 are placed permits sideways or tipped over insertion of the pin.

To facilitate insertion of the pins, the edges of the pin underside 24 are tapered as shown by the dashed lines 40, 41 in FIG. 2b. To facilitate the rolling contact between the edges of the pins and the apertures 5, it is furthermore desirable to similarly taper off the edges of the re-entrant surface 22.

On the inside part of the chain, a locking key 23 is inserted between the lower side of each pin 24 located there and the aperture edge 25 of the link element 1. The key is oriented parallel to and lies under the pin 3. The key has a thickness which suffices to enclose the link elements between the projecting and upstanding pin-end portions 26, 27.

The key 23 can be made from soft steel wire. It is provided with one curved end 38. Its other end 39 is bent over after the key has been located (see FIGS. 3 and 4).

FIGS. 9–11 show another embodiment 45 of the hinge pin. The hinge pin 45 is somewhat thicker than the hinge pin 3. The hinge pin 45 has the same height over its entire length. It can be inserted quite easily into the link elements 1, which simplifies assembly of the chain. But, it makes it necessary to use other locking means for the hinge pins, e.g. a circlip. Each pin 45 has opposite, tapering, longitudinal ends 47, 48, which are delimited by the edges 46. The edge 46 is into contact with the conical disks (not shown) of the transmission. Near the edges of the pin 45, a narrow slot 49 is provided. At its upper and lower sides, the pin has a groove 50. The slot 49 and groove 50 accommodate the circlip 51. After the hinge pins 45 are inserted into the respective openings in the link elements 1, a circlip 51 is mounted at both ends of the pin 45, keeping the pin in the exact position.

FIG. 4, 6 and 8 show that the rows of link elements 1, 12, 13 on the hinge pins 3, 4 which pass through a link aperture 5 are divided into groups 29, 30, separated laterally across the chain by a gap 28. Pressure means 31 placed in the gap 28 and pressing in the lengthwise direction of the pins 3, 4, press the link elements outwardly with respect to the gap 28, against each other and against the locking means 26, 27 for the link group.

This pressure means, which must be elastically and-/or plastically deformable, can, for example, be a rubber cushion. It is illustrated as being a spring plate, bent in stirrup or U-shaped fashion, with legs 32, 33, which have wing-shaped sections 34, 35. At the ends, the sections 34, 35 are provided with end edges 36, 37 which are turned outwardly and which engage without play in the longitudinal direction in apertures 8, 9 of the link elements 12, 1, 13. By this means, the links are also fixed in their longitudinal direction with respect to each other. This prevents the chain from being pulled askew when the peripheral forces at the point of contact with the transmission pulleys of the two cooperating conical disks (not shown) are mutually different.

FIGS. 12a and 12b show another embodiment 52 of the pressure means. It has an H-shaped configuration with a central middle part 53 and four legs 54a ... 54d. As shown in FIG. 12b, when the pressure means is unloaded, the ends of the legs 54a ... 54d lie outside the plane through the middle part 53. The length of the middle part 53 corresponds to and extends along the height of the hinge pins 45. These pressure means can be put into place quite easily during assembly of the chain, with the middle part 53 pressing against the link elements on one side of the gap 28 and the legs 54a ... 54d pressing against the link elements on the other side of the gap.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A transmission chain, comprising a plurality of links intercoupled by a plurality of hinge pins;

each link being comprised of a plurality of link elements; each link element being generally plate-like and having an opening therethrough, the opening being defined by opposed side walls at the leading and trailing sides of the opening;

each hinge pin having opposite, curved, lateral sides; between the lateral sides thereof, the hinge pin being narrower than the width of a link element opening between the opposed side walls of the opening;

one hinge pin extending through the opening in a first link element, and a first lateral side of the one hinge pin contacting the leading side of the opening in the first link element; a second hinge pin extending through the opening in the first link element, and a first lateral side of the second hinge pin contacting the trailing side of the opening in the first link element;

a second link element being positioned to the side of the first link element and offset in one direction along the length of the chain from the first link element; the one hinge pin extending through the opening in the second link element, and a second lateral side of the one hinge pin contacting the trailing side of the opening in the second link element;

a third link element also being positioned to the other side of the first link element and offset in the other direction along the length of the chain from the first link element; the second hinge pin extending through the opening in the third link element, and a second lateral side of the second hinge pin contacting the leading side of the opening in the third link element.

2. The transmission chain of claim 1, wherein each of the link elements includes an end portion at each end thereof beyond the leading and trailing sides, respectively, of the opening in the link element;

the end portions of the first and second link elements overlapping each other between opposed ones of the lateral sides of two consecutive hinge pins; the end portions of the first and third link elements overlapping each other between opposed ones of the lateral sides of two consecutive hinge pins.

3. The transmission chain of claim 1, wherein the opening in the link element is four-sided; the leg of the link element at the side of the opening located facing toward the inside of the endless chain has a greater height than the leg of the link element at the side of the opening in the link element facing toward the outside of the endless chain.

4. The transmission chain of claim 1, wherein each lateral side of each hinge pin is curved symmetrically with respect to the vertical center of the pin, and is asymmetric with respect to the horizontal center of the pin.

5. The transmission chain of claim 4, wherein each lateral side of the hinge pin is cylindrically curved.

6. The transmission chain of claim 1, wherein each hinge pin is sized in height, in comparison with the height and width dimensions of the link element opening, to permit easy insertion of the hinge pin in the link element opening in an upright orientation; the hinge pin having end portions thereof at opposite ends and located beyond the link elements on the hinge pin, and the end portions of the hinge pin being adapted for accommodating locking means for holding the link elements to the hinge pin.

7. The transmission chain of claim 6, wherein the end portions of the hinge pin being adapted for accommodating locking means comprising the end portions being slotted and the locking means comprising a circlip applied in the slot provided therefor in the hinge pin.

8. The transmission chain of claim 1, wherein the hinge pin includes a side facing outwardly with respect to motion of the chain, and this outward side of the hinge pin being shaped to be re-entrant with respect to the ends of the hinge pin; the height of the opening in the link element being related to the height of the hinge pin such that the hinge pin is oriented to be tilted from its upright orientation for installation in the link element opening.

9. The transmission chain of claim 8, wherein the hinge pin has a lower side which faces toward the inside of the transmission chain;
a locking key being inserted between the pin power side and the opposed lower side of the linking element opening; the key being of a thickness for raising the hinge pin when the hinge pin is oriented to the upright condition, to lock the link elements on the hinge pin.

10. The transmission chain of claim 1, wherein the link elements along the length of each hinge pin are grouped such that there is a first group of link elements that are distributed symmetrically with respect to a longitudinally extending center surface of the chain; the link elements of the first group thereof being spaced apart, and in the spaces between the link elements of the first group, link elements of a second and of a third group of the link elements are positioned; adjacent link elements which are positioned side-by-side rest flush against each other; the second and third groups of link elements also being distributed symmetrically with respect to the longitudinally extending center surface of the chain; and the groups of link elements being arranged so that the entire arrangement of link elements repeats itself every three hinge pins along the length of the chain.

11. The transmission chain of claim 10, wherein each of the link elements includes an end portion at each end thereof beyond the leading and trailing sides, respectively, of the opening in the link element;
the end portions of the link elements of the first group and of the link elements of the second group overlapping each other between opposed ones of the lateral sides of two consecutive hinge pins; the end portions of the link elements of the first group and of the link elements of the third group overlapping each other between opposed ones of the lateral sides of two consecutive hinge pins.

12. The transmission chain of claim 10, wherein the link elements are separated by a free slot extension longitudinally along the chain into first and second assemblies of link elements;
pressure means being located in the slot for urging the assemblies of link elements outwardly with respect to the slot along the length of the hinge pins.

13. The transmission chain of claim 1, wherein the link elements are separated by a free slot extension longitudinally along the chain into first and second assemblies of link elements;
pressure means being located in the slot for urging the assemblies of link elements outwardly with respect to the slot along the length of the hinge pins.

14. The transmission chain of claim 13, wherein the pressure means comprises a generally H-shaped spring member, which is shaped so that the legs of the H are out of the plane of the middle part of the H; the spring member being oriented in the slot so that the legs thereof apply pressure to the link elements in the assembly at one side of the slot and the middle part of the spring member applies pressure to the link elements in the assembly at the other side of the slot.

15. The transmission chain of claim 13, wherein the pressure means comprises a spring plate of approximately stirrup shape, and inlcuding legs with outwardly facing projections which engage the link elements of both assemblies thereof which are adjacent the slot for positioning those link elements.

16. The transmission chain of claim 15, wherein the link elements that are engaged by the spring plate include apertures therein for being engaged by the projections of the spring plate.

17. A transmission chain, comprising:
a plurality of links arranged in a chain of the links, and the links being intercoupled by a plurality of hinge pins;
means defining opening means passing through and across the link; the opening means in the link being partly defined by a leading side wall in the opening means, and the leading side wall being located toward the leading end of the link and facing toward the trailing end of the link; the opening means being further partly defined by a trailing side wall in the opening means, the trailing side wall being located toward the trailing end of the link and facing toward the leading end of the link;
each of the hinge pins having opposite lateral sides that are directed along the direction of extension of the links between the leading and trailing ends thereof; each hinge pin being narrower, between the lateral sides thereof, than the opening means of the link in which the hinge pin is positioned, whereby when one lateral side of the hinge pin engages one of the side walls of the opening means in the link, the other lateral side of the hinge pin does not rubbingly engage the link;

a first one of the hinge pins extending through the opening means of the link; the leading end lateral side of the first hinge pin engaging the leading side wall of the opening means in the link, while the trailing end lateral side of the first hinge pin does not rubbingly engage the link;

a second of the hinge pins extending through the opening means of the link; the trailing end lateral side of the second hinge pin engaging the trailing side wall of the opening means in the link, while the leading end lateral side of the second hinge pin does not rubbingly engage the link;

the leading and trailing end lateral sides of the first and second hinge pins, respectively, and the leading and trailing side walls of the opening means being so shaped that the hinge pin lateral sides may roll with respect to and over the respective side walls of the opening means which the hinge pin lateral sides engage.

18. The transmission chain of claim 17, further comprising a second of the links being positioned to one side of the first mentioned link and being offset from the first link in one direction along the length of the chain; one of the first and second hinge pins also extending through the opening means of the second link, and the opposite lateral side of that hinge pin, from the side thereof which engages a side wall of the opening means of the first link, engages a side wall of the opening means of the second link that is opposed to that opposite lateral side of that hinge pin.

19. The transmission chain of either of claims 17 or 18, wherein both lateral sides of each of the hinge pins are convexly curved.

20. The transmission chain of claim 19, wherein each lateral side of each hinge pin is curved symmetrically with respect to the vertical center of the pin, and is asymmetric with respect to the horizontal center of the pin.

21. The transmission chain of claim 20, wherein each lateral side of the hinge pin is cylindrically curved.

22. The transmission chain of claim 18, wherein the second link has opposite leading and trailing ends, and the end of the second link closest to the one of the first and second hinge pins passing through the second link extends to be at the other of the first and second hinge pins.

23. The transmission chain of claim 22, further comprising a third one of the links also being positioned to the one side of the first link and being offset from the first mentioned link in the opposite direction along the length of the chain; the third link also having opposite leading and trailing ends, and the end of the third link which is opposed to the second link also extends to be at the other of the first and second hinge pins.

24. The transmission chain of claim 23, further comprising a fourth one of the links being positioned to the opposite side of the first link from the second and third links, and the fourth link being aligned with the first link along the length of the chain; the first and second hinge pins also extending through the opening means of the fourth link and the leading end lateral side of the first hinge pin and the trailing end lateral side of the second hinge pin respectively engaging the same side walls of the opening means of the fourth link as of the first link;

a fifth one of the links being positioned on the opposite side of the fourth link from the first link and being offset from the fourth link in the one direction along the length of the chain; the one of the first and second hinge pins extending through the second link also extending through the opening means of the fifth link, and the opposite lateral side of that hinge pin from the side thereof which engages a side wall of the opening means of the first and fourth links, engages a side wall of the opening means of the fifth link that is opposed to that opposite lateral side of that hinge pin;

a sixth of the links being positioned at the same side of the fourth link as the fifth link and being offset from the fourth link in the opposite direction along the length of the chain; the sixth link also having opposite leading and trailing ends, and the end of the sixth link which is opposed to the fifth link, also extends to be at the other of the first and second hinge pins.

* * * * *